United States Patent [19]
Lehman

[11] Patent Number: 6,070,850
[45] Date of Patent: Jun. 6, 2000

[54] VIBRATION DAMPENER

[75] Inventor: John Henry Lehman, Boulder, Colo.

[73] Assignee: The United States of America as represented by the Secretary of Commerce, Washington, D.C.

[21] Appl. No.: 09/122,247

[22] Filed: Jul. 24, 1998

Related U.S. Application Data

[62] Division of application No. 08/802,607, Feb. 19, 1997.

[51] Int. Cl.$^7$ .................................................. F16M 13/00
[52] U.S. Cl. ..................... 248/622; 248/644; 52/167.8; 52/167.1; 188/379
[58] Field of Search ..................... 248/580, 592, 248/608, 609, 622, 644, 648, 674, 677, 200.1, 188.8, 638; 52/167.8, 167.1; 267/136; 188/378, 379, 380

[56] References Cited

U.S. PATENT DOCUMENTS

| | | | |
|---|---|---|---|
| 1,590,203 | 1/1926 | Olssen . | |
| 2,095,665 | 1/1937 | Greth | 32/67 |
| 2,736,393 | 2/1956 | O'Connor | 108/380 |
| 2,797,931 | 7/1957 | Hans | 280/758 |
| 3,103,352 | 9/1963 | Steffen | 269/45 |
| 3,129,918 | 4/1964 | Bradley | 248/276 |
| 3,230,595 | 1/1966 | Kedem | 24/257 |
| 4,170,336 | 10/1979 | Malis | 248/276 |
| 4,238,104 | 12/1980 | Hamilton | 248/566 |
| 5,037,060 | 8/1991 | Yalvac | 248/618 |
| 5,207,554 | 5/1993 | Asakawa et al. | 414/744.6 |
| 5,615,664 | 4/1997 | McDonald, Jr. | 124/89 |
| 5,904,066 | 5/1999 | Lehman | 74/89.15 |

OTHER PUBLICATIONS

Product Engineering; May 2, 1960, p. 73.

*Primary Examiner*—Ramon O Ramirez
*Assistant Examiner*—Gwendolyn Baxter
*Attorney, Agent, or Firm*—Patent Law Offices of Rick Martin, P.C.

[57] ABSTRACT

The present invention is a high-precision positioning post having alternating parallel cuts transversing the center-line of the shaft body and which are perpendicular to the major axis of the shaft. The shaft further comprises a bearing rod internal to the shaft which is acted on by a screw. As the screw is turned, the bearing rod forces the end of the shaft to axially translate an object without rotation. This allows an object integral to the shaft or mounted on the shaft to be translated and located along the major axis of the shaft without rotation of the object. In an alternate embodiment the present invention may be used to isolate vibration by inclusion of dampers in the hollow shaft. A third embodiment uses the basic design as a vibration isolation mechanism for buildings.

20 Claims, 4 Drawing Sheets

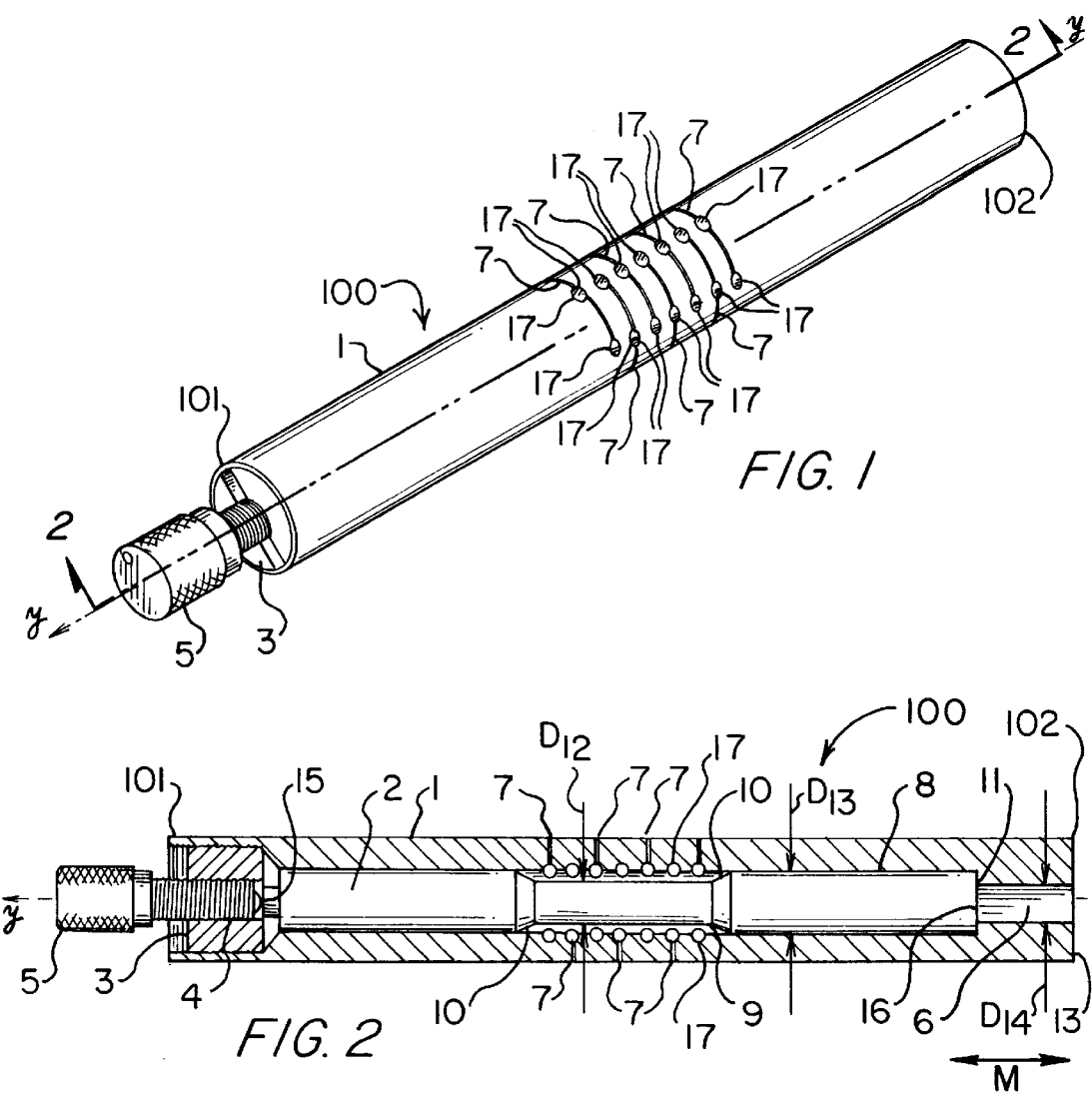
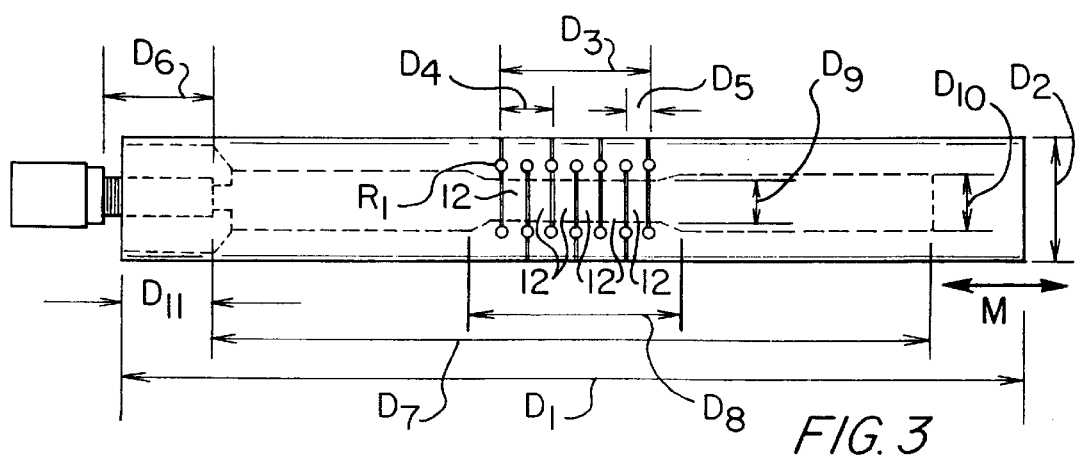

VIBRATION DAMPENER

REFERENCE TO RELATED APPLICATIONS

This application is a divisional of application Ser. No. 08/802,607 filed Feb. 19, 1997.

FIELD OF INVENTION

The present invention relates to an adjustable precision positioning post used to precisely position objects such as lenses, targets and the like on an optical test bench.

BACKGROUND OF THE INVENTION

Devices used for positioning objects on optical benches in laboratory situations are well known. Representative of the art is U.S. Pat. No. 3,103,352 (1963) to Steffen which teaches a workpiece holder comprising two members rotatably held together. Each member has a V-notch to which the workpiece is clamped. The members may be rotated to any position relative to each other so that the V-notches are disposed at any predetermined angle relative to each other.

Another device representative of the art is what is known in the art as a "½-inch post". It is simply a ½-inch diameter post which is rigidly mounted to a base and to which other clamps are attached to support lenses, targets, or other workpieces. These devices tend to rotate the workpiece as the post is adjusted linearly.

What is needed is a high-precision positioning post with high rigidity which does not rotate the workpiece during linear adjustment. Such a breakthrough will significantly reduce position uncertainty of the workpiece due to backlash, wobble or hysteresis. The present invention satisfies this need.

Also representative of the art is:

A translation stage which provides a means for adjustably translating an object on one or more axis.

U.S. Pat. No. 5,207,554 (1993) to Asakawa et al. discloses a supporting device comprising a first member which supports and detects the position of a springy means resiliently supporting a second member.

U.S. Pat. No. 4,170,336 (1979) to Malis discloses a suspension arm and couplings for supporting an operating-room microscope.

U.S. Pat. No. 3,230,595 (1966) to Kedem discloses a device for gripping or clamping rods, wires, or other forms of similarly shaped members.

U.S. Pat. No. 3,129,918 (1964) to Bradley discloses a holder for linear indicators having an adjustable element through a wide range.

U.S. Pat. No. 2,095,665 (1937) to Greth discloses a paralleling and surveying machine to locate tooth surfaces.

U.S. Pat. No. 1,590,203 (1926) to Olssen discloses a support device for adjusting automobile glare shields.

Other publication: Product Engineering; May 2, 1960; page 73; Rotocon assemblers.

SUMMARY OF THE INVENTION

The main aspect of the present invention is to provide a high-precision positioning post.

Another aspect of the present invention is to provide an axially adjustable positioning post.

Another aspect of the present invention is to provide a positioning post which does not rotate a workpiece during axial position adjustment.

Another aspect of the present invention is to provide a positioning post of simple construction.

Another aspect of the present invention is to provide a positioning post with high axial and torsional stiffness.

Another aspect of the present invention is to isolate vibration from a workpiece.

Another aspect of the present invention is to isolate vibration between large masses.

Other aspects of this invention will appear from the following description and appended claims, reference being made to the accompanying drawings forming a part of this specification wherein like reference characters designate corresponding parts in the several views.

The present invention is a high-precision positioning post. The post comprises a hollow shaft having a series of external, center-line traversing, parallel hinge cuts running in a plane perpendicular to the major axis of the shaft. The cuts are arranged alternately in such a fashion to result in an accordion-like pattern of compliant hinges, whereby the shaft may be extended without rotation along its major axis by operation of a central screw. Housed within the center of the hollow shaft is a bearing rod which bears at one end on an internal shoulder in the hollow shaft and at the other end upon an adjustable screw. As the screw is turned, it moves the bearing rod which in turn causes the end of the hollow shaft opposite the screw to translate linearly along the major axis of the hollow shaft. This has the effect of changing the length of the post without causing the end holding the workpiece to rotate. The spring-like elongation of the post allows a user to precisely position a workpiece linearly while avoiding rotation of the workpiece.

In alternate embodiments, the adjustable screw is replaced by a plug. Dampers are inserted between the ends of the bearing rod and the ends of the hollow shaft to achieve isolation of vibration between objects.

BRIEF DESCRIPTION OF THE DRAWINGS

FIG. 1 is a top perspective view of the preferred embodiment.

FIG. 2 is a longitudinal sectional view of the preferred embodiment taken along line 2—2 of FIG. 1.

FIG. 3 is a side plan view of the preferred embodiment showing relative dimensions.

Figure 4:
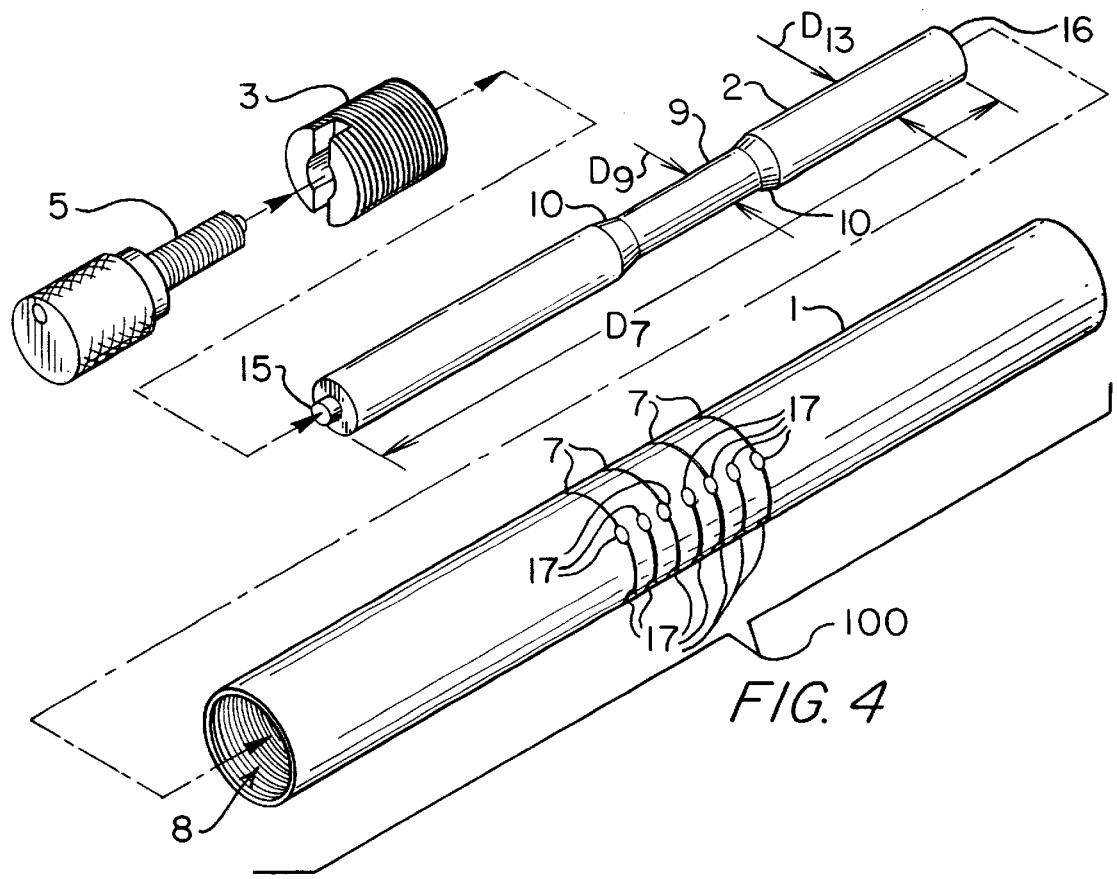
FIG. 4 is an exploded view of the preferred embodiment.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

FIG. 1 is a perspective view of the post 100. Shaft 1 has parallel hinge cuts 7 running perpendicular to the major axis Y of shaft 1. Each hinge cut 7 traverses the centerline or major axis Y of shaft 1. Collar 3 is threadably inserted into the proximal end 101 of shaft 1. Screw 5 is used to adjust the linear position of bearing rod 2 as shown in FIG. 2. Screw 5 is threadably inserted into collar 3. Each hinge cut 7 has a circular relief 17 at a median point and end point.

Reference is made to FIGS. 2, 3. FIG. 2 is a longitudinal sectional view of the preferred embodiment taken along line 2—2 in FIG. 1. Post 100 consists of a shaft 1 having a hollow bore 8 having inside diameter $D_{10}$ running the length $D_7$ along the major axis Y of the shaft 1. Collar 3 is threadably inserted into the proximal end 101 of shaft 1 to depth $D_{11}$. Hole 4 in collar 3 provides a means for inserting the screw 5. Screw 5 is a linear adjustment means which may also comprise a piezo-electric drive mechanism, such as PICOMOTOR™ a trademark of Newfocus, Inc., a DC stepping motor, or a pneumatic drive. Screw 5 bears on bearing rod 2 at surface 15. By turning screw 5 the position of bearing rod 2 relative to the collar 3 is adjusted. At the distal end 102 of shaft 1 is hole 6 having a diameter $D_{14}$. Hole 6 is used to support or contain various items such as a probe point, tweezers, forceps, a dial indicator, or other workpiece. Diameter $D_{13}$ is slightly less than diameter $D_{10}$, so as to achieve a sliding fit. Collar 3 is threaded into shaft 1 so as to contain bearing rod 2 within hollow bore 8. Bearing rod 2 bears upon shoulder 11 in the hollow bore 8 of shaft 1. Bearing shaft 2 has a taper 10 and neck 9. Neck 9 has a diameter $D_{12}$ which is less than $D_{10}$. Hinge cuts 7 are set in the body of shaft 1. Hinge cuts 7 act as hinges allowing the shaft 1 to expand and contract without rotation along the major axis of the shaft 1. Hinge cuts 7 also have a circular relief 17 at a medial and end point. Neck 9 is necessary to accommodate the reduction in diameter of $D_{10}$ to $D_9$ caused by the slight circular rotation (see FIG. 10) of the shaft sections 12 as the shaft 1 axially extends and contracts through movement M. Objects to be borne by the shaft 1 are attached at surface 13 and/or hole 6.

Figure 5:
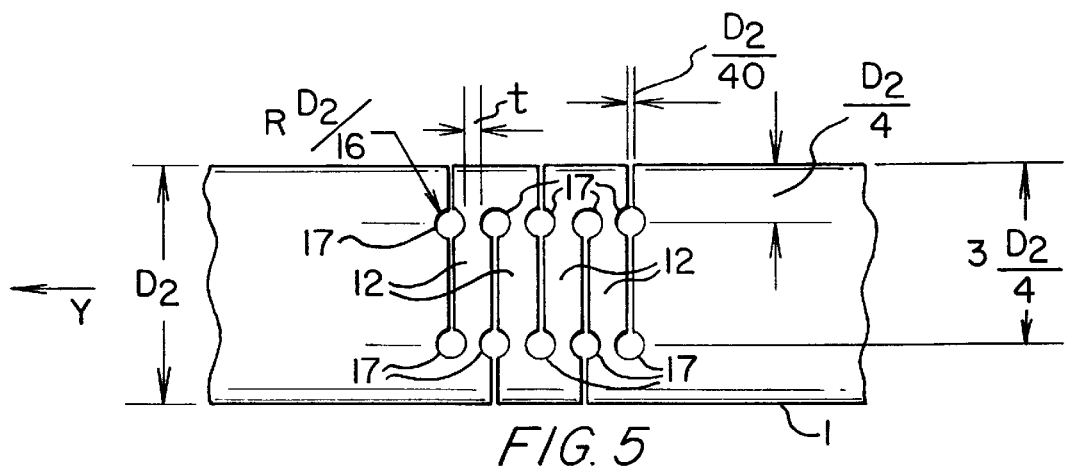
FIG. 5 is a side plan view of the hinge cuts of the preferred embodiment.

FIG. 3 is a side dimensional view showing relative dimensions of the post 100. The "Key" describes each dimensional element. The relationship between each of the major dimensions of the invention are shown below. Assuming that "t" is the distance between the parallel tangents of two adjacent circular reliefs 17 as shown in FIG. 5, then the following may be determined:

$R_1 = 5t$ $D_3 = (n)\ (\frac{1}{2})\ (D4)$ $D_4 = 20t$ $D_5 = \frac{1}{2}\ D4$ $D_8 = n+2$ were n=the number of shaft sections+1.

Other dimensions follow:

$D_1$=overall length of shaft $$D_2 = \frac{50k_i}{E}\sqrt{5t/2}$$

$D_6$=as necessary to accommodate width of screw 5

$D_7$=length of bearing rod 2; >10t(n+1)

$D_9$=diameter of bearing rod neck I.D.<$D_{10}$ $D_{10}$=I.D. of shaft bore $D_{11}$=length of collar 3

Reference is next made to FIG. 4 which is an exploded view of the post 100. Shaft 1 has hinge cuts 7. Each hinge cut 7 has a circular relief 17 at a medial point and at an end point. Bearing rod 2 is of overall length $D_7$. Bearing rod 2 is of diameter $D_{13}$ which is slightly less than $D_{10}$ but greater than $D_9$. Neck 9 of bearing rod 2 is of diameter $D_9$. Bearing rod 2 has taper 10 at each end of neck 9. This allows a sliding fit for bearing rod 2 within hollow bore 8. Threaded screw 5 turns in collar 3 to bear on surface 15. Surface 16 either bears on shoulder 11 or may be rigidly attached to shoulder 11.

Reference is next made to FIG. 5 which is a plan view of the hinge cuts 7. Hinge cuts 7 are arranged as alternating external equi-distant parallel cuts in a plane perpendicular to the major axis Y of shaft 1. Each hinge cut 7 traverses the major axis Y of the shaft 1. The width of each hinge cut is approximately equal to $D_2/40$, and each hinge cut is preferably formed by an ED machine or similar high-precision machining process. Each hinge cut 7 also describes a circular relief 17 which reduces the potential for stress cracking after an extended number of cycles. There are two circular reliefs 17 on each hinge cut 7, located at a median point and at an end point of each hinge cut 7. Each circular relief 17 also has specific, mathematically predictable relevance to the spring constant, $k_i$. This relationship is given in equation (E.) below. Shaft sections 12 operate as hinges in an accordion-like fashion as the shaft 1 extends or contracts by turning screw 5. Linear translation of the shaft 1 is accomplished without imparting rotation to an object which is attached to or is integral to the distal end 102 of shaft 1. The relative dimensions for the thickness of the hinge cuts 7 as well as the radius of each circular relief 17 and the relationship of the location of each circular relief 17 is shown in terms of the diameter of the shaft $D_2$.

Figure 6:
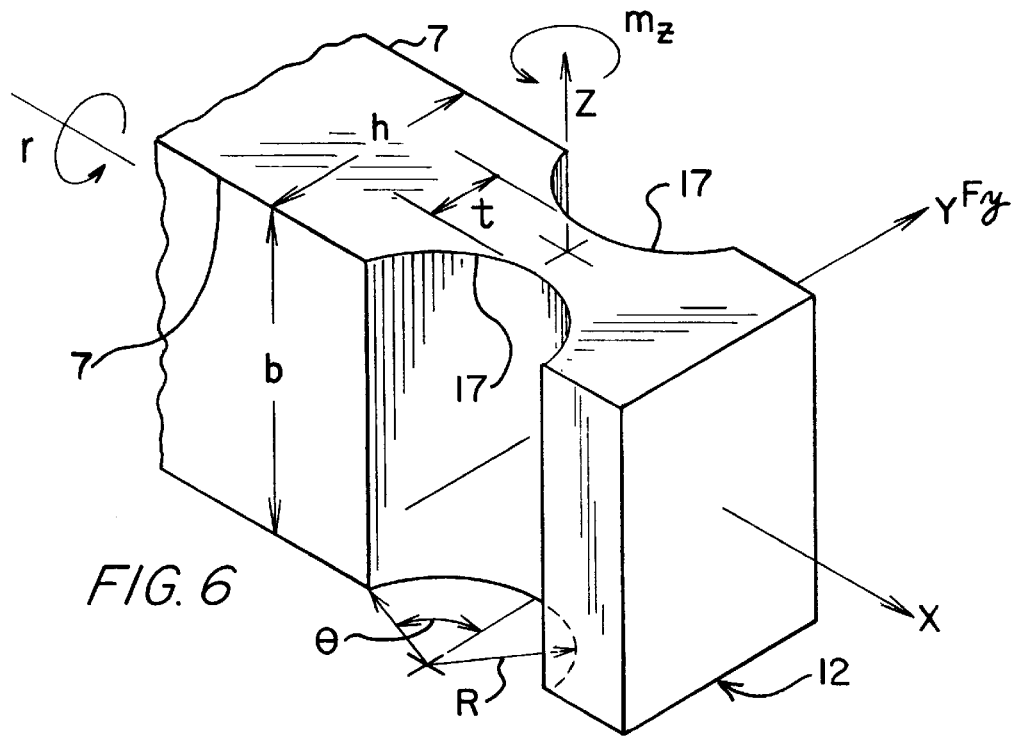
FIG. 6 is a top perspective view of a hinge section showing the relative dimensions.

Referring next to FIG. 6 a perspective view of a shaft section 12 is shown having adjacent circular reliefs 17. Hinge cuts 7 are adjacent to each shaft section 12. The lateral and torsional stiffness of the shaft 1 is found by:

h=shaft section height t=minimum shaft section thickness

R=circular relief radius $M_z$=moment about z-axis from force $F_y$ $F_y$=force orthogonal to z axis $\alpha_z$=angular deflection from force $F_y$ E=modulus of elasticity b=shaft section width $$\gamma = \frac{h}{2R} \tag{A.}$$

Figure 11:
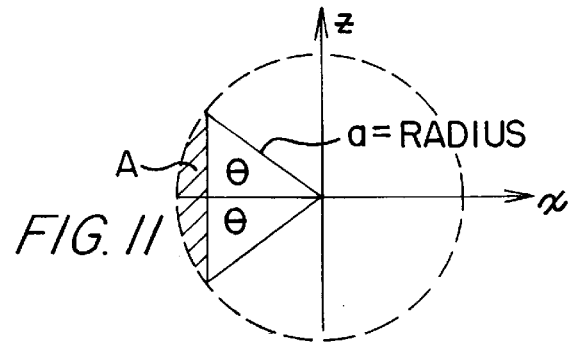
FIG. 11 graphically depicts the variables A, a, and θ in an axial cross-sectional view taken along line 11—11 of FIG. 7.

Compliance or stiffness is approximated by the equation:

$$\frac{\alpha_z}{F_y} = \sqrt{2\gamma - \gamma^2} \left( \frac{9\pi R^{3/2}}{4Ebt^{5/2}} \right) \quad \text{(B.)}$$

assuming t/2R<<1, t/2R<<h/2R.
The determination of the torsional stiffness is as follows:
  J=Polar moment of inertia
  h=distance between adjacent edges of cuts
  L=(cuts −1)(h)
  T=Torque
  G=shear modules of chosen material
  θ=shown in drawing α proportional to cut radius and inversely proportional to depth
  A, a, and θ are depicted in FIG. 11.

$$J = \frac{Aa^2}{4} \left\{ \left[ 1 + \frac{2\sin^3\theta\cos\theta}{\theta - \sin\theta\cos\theta} \right] + \left[ 1 - \frac{2\sin^3\theta\cos\theta}{3(\theta - \sin\theta\cos\theta)} \right] \right\} \quad \text{(C.)}$$

Total angle of twist $$\phi = \frac{LT}{GJ}$$

for a total input torque, T.

The equation gives the overall stiffness of the shaft to an applied torque. The torque may be applied to the exterior surface of the shaft by mechanical means acting upon the exterior surface or by turning the proximal end 101 relative to the distal end 102.

Figure 7:
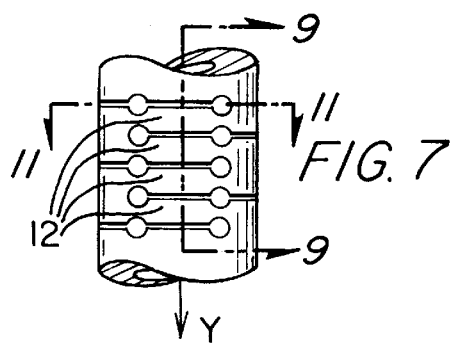
FIG. 7 is another side plan view of the arrangement of the hinges.

FIG. 7 depicts an arrangement of shaft sections 12 from which a spring rate is determined. Spring rate k for a post 100 having "n" cuts is:

shaft sections=$n-1$ hinges=$2(n-1)$

The spring rate is calculated from considering the spring rate for each shaft section added in parallel.

$$\frac{1}{k} = \frac{1}{k_1} + \frac{1}{k_2} + \frac{1}{k_3} + \cdots + \frac{1}{k_{(n-1)}} \quad \text{(D.)}$$

(E.) where $$k_i = \left[ \sqrt{2\gamma - \gamma^2} \left( \frac{9\pi R^{3/2}}{4Ebt^{5/2}} \right) \right]^{-1} \quad \text{(E.)}$$

$$\frac{1}{k} = (n-1)\left(\frac{1}{k_i}\right) \quad \text{(F.)}$$

or $$k = \frac{k_i}{n-1} \quad \text{(G.)}$$

Figure 8:
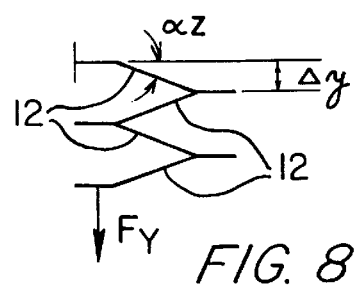
FIG. 8 is a depiction of the relative motion of the hinge member.

FIG. 8 depicts the relative motion of the shaft sections through the distance Δy. This is caused by extension of the shaft 1 (not shown) by application of force Fy. Force Fy is created by turning screw 5 against bearing rod 2. Angle $\alpha_z$ is the relative rotational movement of shaft section 12.

Figure 9:
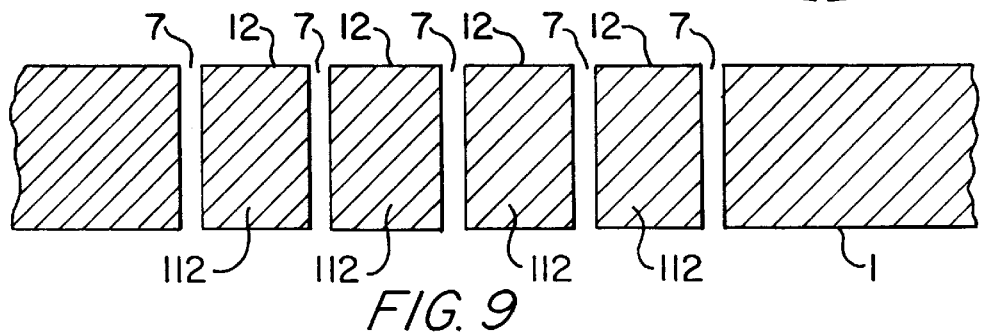
FIG. 9 is a longitudinal sectional view taken along line 9—9 of FIG. 7.

FIG. 9 is a longitudinal sectional view taken along line 9—9 of FIG. 7 of one side of shaft 1. The ends 112 of shaft sections 12 are depicted. Hinge cuts 7 are shown between each shaft section 12. This figure shows the relative positions of shaft sections 12 prior to turning screw 5 (FIG. 2) so as to extend the shaft 1.

Figure 10:
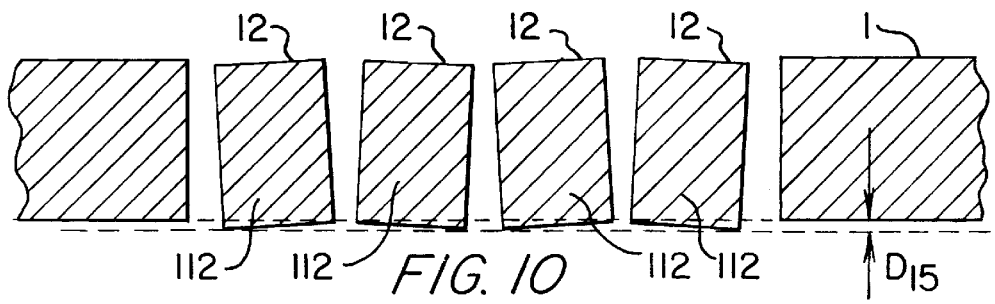
FIG. 10 is a view of the rotation of each hinge member from FIG. 9 during elongation.

FIG. 10 is the same view as FIG. 9 showing the relative rotation of each shaft section 12 after the shaft 1 has been extended by turning screw 5. Due to the slight rotation of shaft sections 12 caused by axial extension of the shaft 1, the inside diameter $D_{10}$ of the shaft 1 is slightly diminished by dimension $D_{15}$. It is because of this relative decrease in the inside diameter $D_{10}$ shown in FIG. 3 that the neck 9 is required in bearing rod 2. The diameter of neck 9, $D_{12}$, is slightly less than diameter $D_{15}$ so as to prevent the edges of shaft sections 12 from binding on bearing rod 2 during extension of the shaft 1.

FIG. 11, a cut 11—11 from FIG. 7, graphically depicts the variables A, a and θ as used in equations (B.) and (C.) A is the area of a given hinge member falling within an arc of radius "a" emanating from the centerline of shaft 1. The arc of radius "a" intersects said area A within the angular dimensions of 2θ.

Figure 12:
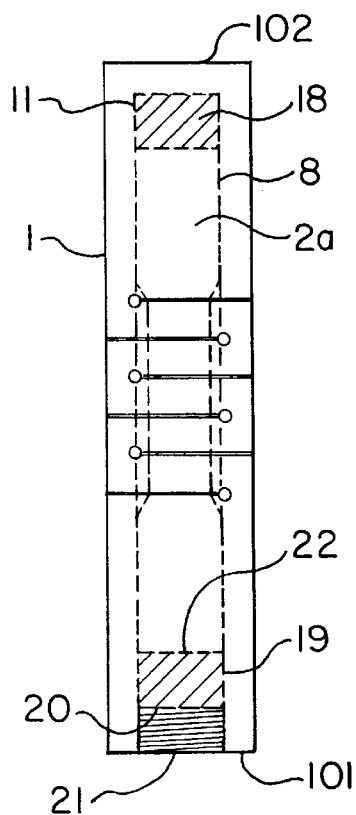
FIG. 12 is a cross section of an alternate embodiment.
Figure 14:
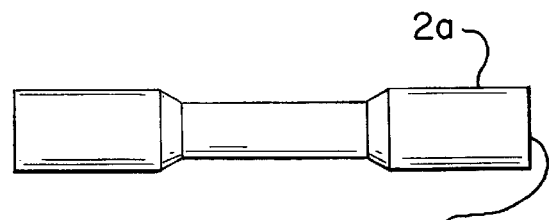
FIG. 14 is a side view of the bearing rod for an alternate embodiment.

An alternate embodiment of the invention is depicted in FIG. 12. The alternate embodiment depicts a vibration isolation mechanism made by the inclusion of a damping material at each end of a shorter bearing rod 2a. A use of this alternate embodiment would be that of isolating vibration that might otherwise impinge on an optical element or other workpiece mounted on the shaft 1 at distal end 102. In order to accomplish the vibration isolation function, the structure of the invention may be configured as in a spring-dampener system whereby bearing rod 2 shown in FIG. 4 is replaced by a similar, shorter bearing rod 2a, as shown in FIGS. 12, 14. The difference in length of bearing rod 2a versus bearing rod 2 is made up using a damping material for dampers 18 and 19 such as an elastomer or other equally elastic or resilient material. Damper 18 and damper 19 are of diameter $D_{10}$ as noted in FIG. 3. Damper 18 is inserted in hollow bore 8 between bearing rod 2a and shoulder 11. Damper 19 is inserted in hollow bore 8 between surface 22 and surface 20. Damper 19 may or may not be included at the discretion of the user, with the length of bearing rod 2a and/or plug 21 adjusted accordingly. Plug 21 is inserted in the threaded end of hollow bore 8 in place of collar 3. In this alternate embodiment, the screw 5 shown in FIG. 2 is not used, but the flexure configuration and physical and mechanical characteristics of shaft 1 and bearing rod remain. The screw effect is substituted by the vibration itself, either free or forced. The invention, when rigidly attached at the proximal end 101 to a mounting surface and having a mass connected at the distal end 102 is capable of isolating a driven vibration which may otherwise impinge on the mass at the distal end 102. The dampening effect is accomplished by dampers 18 and 19 while the spring effect is provided by the flexure pattern of shaft 1. The invention provides axial support with minimal rotation, wobble, and backlash. The damping coefficient is a function of the material selection of the damper (s). Expressions for compliance and torsion of the shaft for the alternate embodiment are as given in the description for FIGS. 3, 6, and 7.

Figure 13:
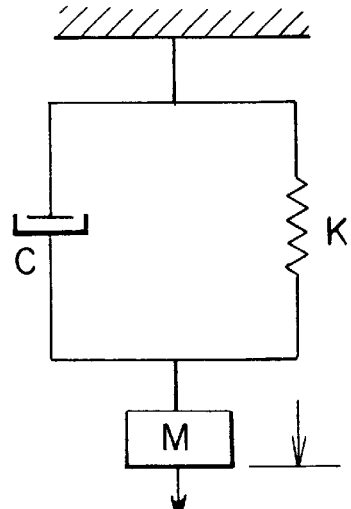
FIG. 13 is a schematic of a mass-damper system.

An accepted vibration isolation behavior model consists of a spring, a mass, and a damper as depicted in FIG. 13. A vibration isolation system of the type depicted in the alternate embodiment may be used to isolate a one-time disturbing force (free vibration) or repeated force (forced vibration). The system is typically modeled by the following differential equations:

Damped, free vibration:

$$my''+Cy'+ky=0$$

Damped, forced vibration:

$$my''+Cy'+ky=F(t)$$

where m is the mass of some isolated matter (mass units), C is the damping coefficient of the mechanical capacitance (mass units per time), and k is the spring constant of the mechanical compliance (units of force per distance). The y" and y' nomenclature represent the second and first derivative with respect to time of the relative position, y, of the isolated mass. F(t) describes the magnitude of a perturbing force as a function of time (force units).

FIG. 14 depicts a side view of bearing rod 2a used in the alternate embodiment described and shown in FIG. 12 above. Surface 22 bears upon damper 19 which in turn bears on plug 21 as shown in FIG. 12.

Figure 15:
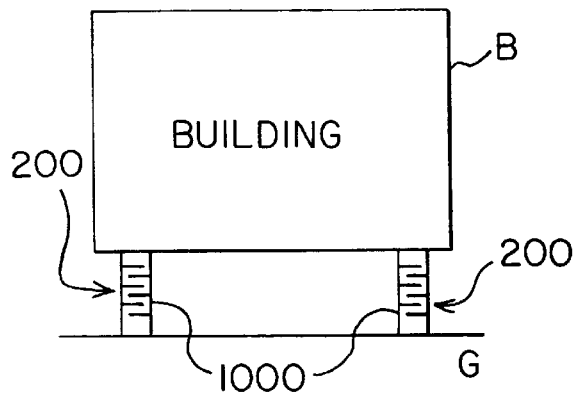
FIG. 15 is a schematic of an alternate embodiment arrangement under a building.

In yet a third embodiment of the invention, the invention may be scaled up from FIGS. 12 and 14 to provide vibration isolation on massive structures. One embodiment is between a building and its foundation to provide protection for the building from earthquake-related vibration and shock. FIG. 15 depicts the alternate embodiment 200 of the vibration damper mechanism installed between a building B and the ground G. The vibration damper mechanism 200 is structurally larger than shaft 1 of FIG. 12, but consists of the same fundamental design as shaft 1 and is, thus, numbered "shaft 1000". This alternate embodiment will require a shaft analogous to item 1 of FIG. 1, bearing rod item 2 of FIG. 2, and damping element(s) each having dimensions several times (×2,×10,×100, etc.) larger than the embodiment shown in FIG. 12 to optimize "k" and "C" for varying conditions of "m" and "F(t)". As described for the prior FIGS. 3, 6, 7, and 13, the flexure dimensions and spacing for this alternate embodiment will determine the compliance. The dimensions and material selection will ultimately determine the suitability of the embodiment for various vibration and loading conditions. During, for example, an earthquake (low frequency, low amplitude vibration), movement of the ground G would normally impart vibration and shock to building B due to building B being constructed on a rigid foundation directly tied to the ground G. By placing building B on one or more vibration damper mechanisms 200 one may isolate building B from ground vibration. Of course, vibration damper mechanism 200 must also be of sufficient strength to fully support the weight of the building B. This embodiment has other applications in areas where the building B must be isolated from foundation vibration other than that caused by earthquakes, for example, high winds and traffic (high frequency, low amplitude vibration).

Although the present invention has been described with reference to preferred embodiments, numerous modifications and variations can be made and still the result will come within the scope of the invention. No limitation with respect to the specific embodiments disclosed herein is intended or should be inferred.

KEY $D_1$ Overall length of shaft
$D_2$ Overall width of shaft
$D_3$ Overall axial length between hinge cuts
$D_4$ Major cuts separation
$D_5$ Minor cuts separation
$D_6$ Screw length
$D_7$ bearing rod length
$D_8$ Shoulder to shoulder length
$D_9$ Neck
$D_{10}$ I.D. of shaft (hollow bore)
$D_{11}$ Screw depth in collar
$D_{12}$ Neck diameter
$D_{13}$ Bearing rod diameter
$D_{14}$
$D_{15}$ Reduced hollow bore I.D. ($D_{10}$) by shaft section rotation

| 1. | Shaft | 10. | Taper |
| 2. | Bearing rod | 11. | Shoulder |
| 2a | Bearing rod | 12. | Shaft section |
| 3. | Collar | 13. | Surface |
| 4. | Hole | 14. | |
| 5. | Screw | 15. | Surface |
| 6. | Hole | 16. | Surface |
| 7. | Hinge cut | 17. | Circular relief |
| 8. | Hollow bore | 18. | Damper |
| 9. | Neck | 19. | Damper |

20. Surface
21. Plug
22. Surface
100. Post
101. Proximal end
102. Distal end
103.
104.
105.
106.
107.
108.
109.
110.
111.
112. Ends
200. Vibration damper mechanism
1000. Shaft
A. Area
Y. Major axis
a. Radius
G. Ground
k. Spring rate
m. Mass
M. Movement

I claim:

1. A positioning post comprising:
    a hollow shaft having a distal and a proximal end;
    said hollow shaft further comprising at least two hinge cuts arranged in an alternating parallel pattern perpendicular to a major axis of the shaft and traversing a centerline of the major axis of the hollow shaft, whereby a series of shaft sections are created;
    said proximal end having an internal shoulder facing said distal end;
    a bearing rod slidingly contained inside the hollow shaft between the internal shoulder and the distal end; and
    a first damper contained inside said hollow shaft functioning to damp a vibration in the hollow shaft.

2. The positioning post of claim 1, wherein said two hinge cuts, each further comprise a circular relief at a median point and at one end.

3. The positioning post of claim 2, wherein said bearing rod further comprises a narrow mid-section.

4. The positioning post of claim 1, wherein the first damper has a location between the bearing rod and the internal shoulder.

5. The positioning post of claim 4 further comprising a second damper contained inside said hollow shaft between the bearing rod and the distal end.

6. The positioning post of claim 5, wherein said second damper comprises a resilient material.

7. The positioning post of claim 5, wherein said second damper comprises an elastic material.

8. The positioning post of claim 4, wherein said first damper comprises a resilient material.

9. The positioning post of claim 4, wherein said first damper comprises an elastic material.

10. A vibration damping mechanism to support a building for damping vibration between a building and the ground comprising:

a hollow shaft having a distal and a proximal end;

said hollow shaft further comprising at least two hinge cuts arranged in an alternating parallel pattern perpendicular to a major axis of the shaft and traversing a centerline of the major axis of the hollow shaft, whereby a series of shaft sections are created;

said proximal end having an internal shoulder facing said distal end;

a bearing rod slidingly contained inside the hollow shaft between the internal shoulder and the distal end; and a first damper contained inside said hollow shaft between said internal shoulder and said bearing rod functioning to damp a vibration in the hollow shaft; and a second damper contained inside said hollow shaft between said bearing rod and said distal end functioning to damp a vibration in the hollow shaft.

11. The vibration damping mechanism of claim 10, wherein said hinge cut further comprises a circular relief at a median point and at one end.

12. The vibration damping mechanism of claim 11, wherein said bearing rod further comprises a narrow mid-section.

13. The vibration damping mechanism of claim 12, wherein said damper comprises an elastic material.

14. The vibration damping mechanism of claim 12, wherein said damper comprises a resilient material.

15. A vibration dampener comprising:

a hollow shaft having a first end and a second end;

said hollow shaft further comprising alternating parallel cuts, said parallel cuts arranged perpendicular to a major axis of said hollow shaft;

said first end comprising a shoulder facing said second end;

a bearing rod slidingly contained within said hollow rod;

a first damper contained between said bearing rod and said shoulder; and said second end containing a second damper upon which said bearing rod bears.

16. The vibration damping mechanism of claim 15, wherein said cuts further comprise a circular relief at a median point at one end.

17. The vibration damping mechanism of claim 16, wherein said bearing rod further comprises a narrow mid-section.

18. The vibration damping mechanism of claim 17, wherein each of said first and second damper comprise an elastic material.

19. The vibration damping mechanism of claim 17, wherein each of said first and second damper comprise a resilient material.

20. In a device for positioning an object on an optical bench wherein a positioning post connects the optical bench to a device for clamping the object to be positioned, an improvement to the positioning post comprising:

a hollow shaft having a distal and a proximal end wherein distal end is adapted for connecting to an optical bench and proximal end is adapted to connect to a clamping device adapted to holding the object to be clamped;

said hollow shaft further comprising at least two hinge cuts arranged in an alternating parallel pattern perpendicular to a major axis of the shaft and traversing a centerline of the major axis of the hollow shaft, whereby a series of shaft sections are created;

said proximal end having an internal shoulder facing said distal end;

a bearing rod slidingly contained inside the hollow shaft between the internal shoulder and the distal end; and a first damper contained inside said hollow shaft between said internal shoulder and said bearing rod functioning to damp a vibration in the hollow shaft; and a second damper contained inside said hollow shaft between said bearing rod and said distal end functioning to damp a vibration in the hollow shaft.

* * * * *